Aug. 17, 1943.   A. L. MAYER   2,326,959
SHUTTER CONTROL MECHANISM FOR PHOTOGRAPHIC PRINTERS
Filed Nov. 14, 1940

INVENTOR
ALVIN L. MAYER
BY Zugelter & Zugelter
ATTORNEYS

Patented Aug. 17, 1943

2,326,959

UNITED STATES PATENT OFFICE 2,326,959

SHUTTER CONTROL MECHANISM FOR PHOTOGRAPHIC PRINTERS

Alvin L. Mayer, Cincinnati, Ohio

Application November 14, 1940, Serial No. 365,679

10 Claims. (Cl. 88—24)

This invention relates to photographic apparatus, and more particularly to a method and means for controlling exposure time.

An object of the present invention is to provide auxiliary shutter means for printing enlarging machines, and the like, which means are adapted to automatically terminate the exposure time of the sensitized printing paper upon the expiration of a timing cycle initiated concurrently with the start of the exposure period.

Another object of the present invention is to provide means of the character hereinabove described which are structurally and mechanically simple, inexpensive, yet durable and reliable.

These and other objects are attained by the means described herein, and disclosed in the accompanying drawing, in which.

Figure 1:
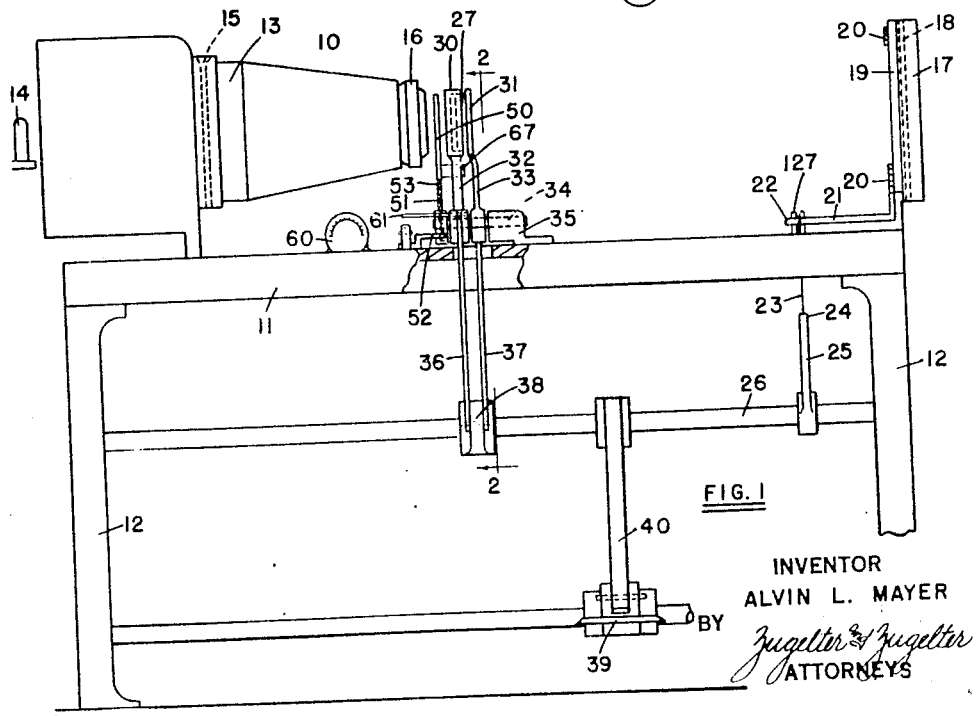
Fig. 1 is a side elevational view of a printing enlarging machine embodying the present invention.

The printing enlarging machine 10 to which the present invention is applied is disclosed in Fig. 1, wherein the numeral 11 indicates the bed or frame of the machine, which may be supported upon leg standards 12. A projector 13, including a constant source of illumination, such as electric lamp 14 is mounted on the left end of the bed for projecting the images of photographic negatives, placed laterally in film gate 15, through projection lens 16. Means are disposed at the right end of bed 11 into which the image of a negative mounted within gate 15 is projected. Such means may, in its simplest form, comprise a photographic paper support 17, including a paper gate 18 into which a sheet of sensitized printing paper may be laterally disposed for exposure.

The particular printing enlarging machine herein disclosed includes a so-called projection screen or preview door 19 pivotally mounted relative to paper support 17 by means of hinges 20, or the like.

Suitable means, not illustrated, are provided for normally urging the projection screen in a closed, projection beam interrupting position in coplanar adjacency with the plane of the sensitized printing paper mounted within gate 18.

Means are provided for swinging projection screen 19 about its vertical axis for the purpose of uncovering or exposing the sensitized paper mounted therebehind to the projection beam. It should be understood that the present invention is not concerned with, nor directed to the particular means for actuating the projection screen about its vertical axis, however for completeness of detail, and solely by way of example, said screen may be actuated in the following manner. A screen actuator lever 21 may be secured to screen 19 as at lower hinge 20. The free outer end 22 of said lever may be suitably connected by means of a cable 23, or the like, to the upper end 24 of an arm 25, the lower end of which is carried by and operatively secured to rock shaft 26. Cable 23 is shown passing over a pulley 127, which may be appropriately mounted to bed 11, whereby rotation of rock shaft 26 about its longitudinal axis will pull the free end 22 of lever 21 towards pulley 127, thereby swinging projection screen 19 out of the projection field of lens 16, to an open position.

If desired, any other type of screen actuating mechanism may be used, such as, by way of example, the mechanism disclosed in U. S. Patent No. 2,107,867 issued to A. L. Mayer on February 8, 1938.

The purpose of projection screen 19 is to provide a suitable background upon which the projected image of a negative mounted within gate 15 may be projected for observation and preview by an operator. In this manner an operator may observe the outline and relative position which the projected image will assume upon the sensitized printing paper mounted in gate 18, prior to the actual exposure of said paper to the projection beam.

In order to effectively interrupt the projection beam during those periods of time during which the projection screen 19 is being opened or closed relative to support 17, for respectively exposing and covering the sensitized printing paper mounted therein, shutter means denoted generally by the numeral 27 may be employed. At the outset it should be noted that shutter means 27 is similar to the shutter device illustrated in Fig. 12 of the hereinabove identified Mayer Patent No. 2,107,867. Shutter means 27 may comprise means, operable concurrently with the opening and closing of the projection screen 19 whereby the projected beam is interrupted as the projection screen is being moved to an open or closed position relative to support 17.

Shutter means 27 may comprise a pair of individual shutter elements 30 and 31 each of which is formed on bell crank elements 32 and 33 respectively, and which bell crank elements are, in turn, pivotally mounted upon shaft 34 carried by bracket 35, secured to bed 11. The lower end of bell cranks 32 and 33 may be connected by links 36 and 37 to an arm 38 which is fixed to rock shaft 26, which in turn is operatively connected to foot treadle 39 by means of link 40, as shown.

Shutter elements 30 and 31 are designed so as to normally permit the passage of a projected beam from projection lens 16 onto projection screen 19 during those periods of time when said screen is closed against support 17, as disclosed in Fig. 1. As shaft 26 is rotated links 36 and 37 cause the individual shutter elements 30 and 31 to move past one another across the optical axis of projection lens 16, for obstructing the projection beam projected from said lens onto screen 19. The projection beam is interrupted as the body portions 41 and 42 of said shutter elements are moved past one another from the position of Fig. 2, to the position of Fig. 3. It will be observed that in Fig. 3 the individual shutter elements 30 and 31 have been moved past each other to a full open position wherein their respective arcuate portions 43 and 44 provide a substantial circular opening 45 in front of lens 16. The projection beam from lens 16 is projected through this opening 45 onto support 17.

The screen actuating means are preferably coordinated relative to shutter 27 by means of rock shaft 26 so as to synchronize the opening and closing of screen 19 with the action of said shutters, in order that the following sequence of operation will take place.

As each negative is placed in gate 15 it is projected through a suitable aperture or anti-haze lens 68 of shutter element 30 onto projection screen 19. The shutter elements are in the open position indicated in Fig. 2 and the projection screen is closed against support 17 for precluding exposure of paper mounted in gate 18. As the operator depresses treadle 39 the shutter elements 30 and 31 are shifted to the relative positions of Fig. 3, and simultaneously therewith, while the projection beam is momentarily interrupted, screen 19 is opened, thereby exposing the paper in gate 18 to the projection beam.

Figure 2:
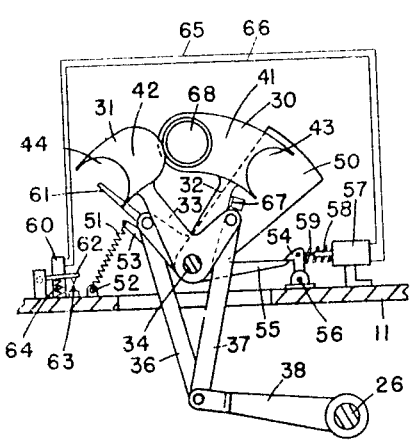
Fig. 2 is a sectional view on line 2—2 of Fig. 1 showing the shutter elements prior to an exposure period.

In order to terminate the exposure period it would be necessary for the operator to release foot treadle 39 thereby simultaneously closing screen 19 and returning the shutter elements to their initial settings of Fig. 2. By reason of the human-element-factor which entered into the termination of the exposure period, the duration of the exposure period of the sensitized paper would not be constant, whereby the resultant prints would, too often, be either over or under exposed, thereby increasing waste and decreasing the efficiency of the machine.

In order to obviate this human-error-element an auxiliary shutter 50 is provided which is adapted to accurately and automatically control the length of time during which the projected beam may fall upon the sensitized printing paper mounted within gate 18. Said auxiliary shutter may comprise a plate like member, the lower end of which is suitably mounted on shaft 34, being disposed between shutter element 30 and projection lens 16, as clearly disclosed in Fig. 1. Means are provided for normally maintaining said auxiliary shutter in the open, retracted position disclosed in Fig. 2 so as not to interfere with or obstruct the beam of projected light from lens 16.

If desired, auxiliary shutter 50 may be provided with an extending arm 55, the outer end of which is adapted to be engaged by catch 54. The auxiliary shutter is continually urged in a counterclockwise direction about shaft 34 by means of a spring 51 interposed between elements 52 and 53 which are secured to machine bed 11 and auxiliary shutter 50 respectively.

Figure 3:
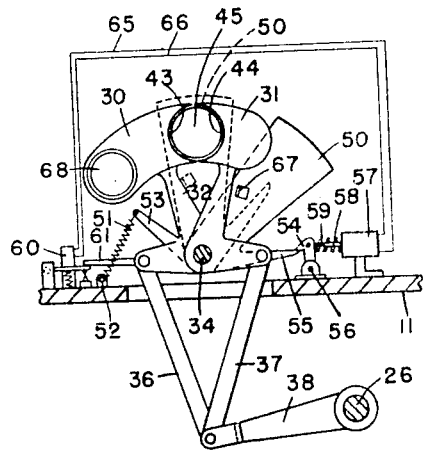
Fig. 3 is a view similar to Fig. 2 showing the shutter elements during a projection period.

As clearly discernible from Figs. 2 and 3 the upper end of catch 54 is adapted to be moved about a pivot 56 to effect engagement or disengagement with arm 55. Catch 54 is adapted to be swung to the right of arm 55 when plunger 58 of solenoid 57 is shifted to the right upon energization of said solenoid. If desired, a spring 59 may be interposed between the adjacent faces of catch 54 and solenoid 57, and encircling plunger 58, for normally urging said catch away from solenoid 57 to an arm (55) engaging position, during those periods of time when said solenoid is de-energized.

The electrical circuit to solenoid 57 may be controlled by means of a suitable timer device, denoted generally by the numeral 60. It should be understood that such a timer may be of any approved type, electrical or mechanical, so long as it will function to close an electrical circuit upon the expiration of a predetermined timing cycle.

In order to initiate a timing cycle, the start of which is concurrent with the opening of shutter elements 30 and 31 for the projection of a beam of light onto the sensitized paper mounted in gate 18 of paper support 17, shutter element 30 may be provided with an extension 61 which is adapted to engage an actuating means which in turn initiates the timing cycle of timer 60.

If desired, extension member 61 may close an electrical circuit to timer 60 by depressing a movable contact arm 62 downwardly to engage a fixed contact point such as 63 for completing an electrical circuit to said timer. Contact points 62 and 63 may be normally spaced apart by means of spring 64, mounted as shown. Timer 60 may be wired to solenoid 57 by means of conductors 65 and 66, said circuit normally being open. It should be observed that the timing cycle is initiated upon closing of contacts 62 and 63, and that after a predetermined period of time has elapsed, the electrical circuit to solenoid 57 is closed by suitable mechanism housed within timer 60 for energizing said solenoid and simultaneously therewith disengaging catch 54 from auxiliary shutter arm 55.

When thus released auxiliary shutter 50 will be snapped to the left about shaft 34 under the influence of spring 51, to assume the beam interrupting position indicated by the broken lines of Fig. 3. If desired, the travel of auxiliary shutter 50 may be terminated or limited by reason of lip 67 contacting bell crank arm 32 of shutter element 30, as shown in Fig. 3. Lip 67 may, if desired, be stamped from the body of the auxiliary shutter, as illustrated.

From the foregoing it will be apparent that the projected beam from lens 16 will be automatically and completely blocked or obstructed by the auxiliary shutter 50 upon the expiration of the timing cycle initiated within timer 60 when the shutter elements 30 and 31 have been moved to their full open positions as indicated in Fig. 3, thereby definitely fixing the period of exposure. It should be observed that the actuation of said auxiliary shutter is entirely independent of any action on the part of an operator, and that shutter elements 30 and 31 and projection screen 19 will remain open until treadle 39 has been released.

The auxiliary shutter is adapted to be returned to its initial retracted open position concurrently with the movement of shutter elements 30 and 31 to their initial positions disclosed in Figs. 1 and 2. This is expeditiously accomplished by reason of the engagement between lip 67 of auxiliary shutter 50 with bell crank arm 32 of shutter element 30. As shutter element 30 is swung to the right when treadle 39 is released, the auxiliary shutter 50 is likewise shifted to the right about shaft 34 whereby arm 55 will be engaged by catch 54. As disclosed in the drawing the under surface of arm 55 to the upper surface of catch 54 may be suitably tapered whereby to effect such a latching engagement.

Figure 4:
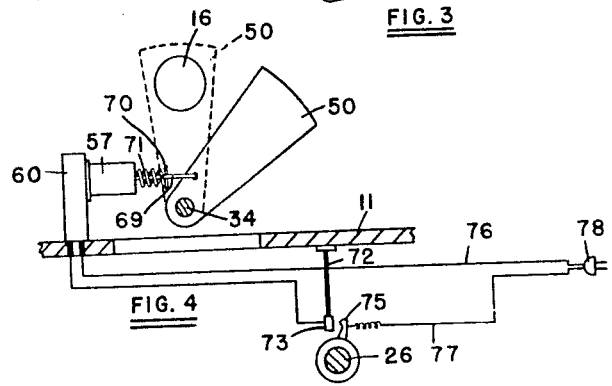
Fig. 4 is a diagrammatic view of a modified form of auxiliary shutter actuating means.

In Fig. 4 a simplified auxiliary shutter control means is illustrated wherein the auxiliary shutter 50 is pulled counterclockwise about shaft 34 to the projection-beam-interrupting-position denoted by the broken lines, by solenoid 57. A timing cycle is initiated when movable contact arm 75 engages the fixed contact 73 thereby completing an electrical circuit to solenoid 57. In order to provide a proper time delay between the closing of the electrical circuit and the energization of the solenoid, suitable electrical time delay means such as an electronic timer, dashpot, or the like, 60 is interposed in the solenoid circuit as illustrated.

Upon the expiration of a timing cycle, solenoid 57 is energized, shaft 69 is pulled to the left and auxiliary shutter is snapped into a vertical, beam interrupting position, before lens 16. Shutter 50 will remain in a beam interrupting position until the electrical circuit is broken when the operator releases foot treadle 39 for shifting contact 75 away from contact 73.

The auxiliary shutter is adapted to be shifted to a retracted position upon de-energization of the solenoid by reason of spring 71 interposed between pin 70 and the solenoid housing.

It should be understood that contact 73 will be suitably mounted, as by means of a bracket 72 and that contact 75 will be suitably secured to and carried by rock shaft 26 whereby to engage contact 73 concurrently with the initiation of an exposure period of sensitized paper mounted in gate 18. Electrical energy may be supplied via conductors 76 and 77 which may be connected to a source of electrical energy by means of plug 78.

It should be noted that once the projection beam is interrupted by the auxiliary shutter 50, said beam remains interrupted until the projection screen 19 is closed concurrently with the return of the shutter elements 30 and 31 to their initial open positions of Fig. 2.

From the foregoing, it is apparent that the human-error-element has been effectively eliminated, in so far as it affects the exposure periods to which the printing paper is subjected during projection, by providing the auxiliary, automatic shutter 50 which effectively terminates the period of exposure upon the expiration of a predetermined timing cycle. It should be observed that the operator may release treadle 39 for simultaneously closing shutter elements 30 and 31 and moving the projection screen 19 into the projection field of the lens just as soon as the auxiliary shutter 50 has interrupted the projection beam. The actuation of the auxiliary shutter informs the operator that the proper exposure period has been attained, thereby eliminating all guess work on the part of the operator.

It is to be understood that various modifications and changes in the structural details of the device may be made, within the scope of the appended claims, without departing from the spirit of the present invention.

What is claimed is:

1. In a photographic device a film support, a paper support, a projection lens, a source of light, a projection screen normally disposed between said lens and said paper support, a shutter for said lens, means for moving said screen out of the field of projection of said lens, means interconnected with said screen moving means for operating said shutter to expose said paper after the movement of said screen from between the lens and the paper support, and an auxiliary shutter for said lens under the control of a timer actuated by said first mentioned shutter for terminating the exposure of said paper independently of said first mentioned shutter.

2. In a photographic device, a film support, a paper support, a projection lens, a projection screen normally disposed between said lens and said paper support, a shutter for said lens, a timer, an auxiliary shutter for said lens under the control of said timer, means for moving said screen out of the field of projection of said lens, means interconnected with said screen moving means for operating said shutter to expose said paper after the movement of said screen from between said lens and paper support, and to simultaneously initiate a timing cycle in said timer, and means under the control of said timer for actuating said auxiliary shutter for terminating the exposure period of the paper independently of said first mentioned shutter.

3. In a photographic device, a film support, a paper support, a projection lens, a projection screen normally disposed between said lens and said paper support, a shutter for said lens, manually controlled means for simultaneously moving said screen out of the field of projection of said lens and for operating said shutter to expose said paper after the movement of said screen from between said lens and paper support, an auxiliary shutter for said lens, automatic timer means for actuating said auxiliary shutter upon the expiration of a predetermined time cycle to terminate the exposure of said paper, and means for initiating a timing cycle coincident with the exposure of said paper.

4. In a photographic device, a film support, a paper support, a projection lens, a projection screen between said lens and said paper support, a shutter for said lens, an auxiliary shutter for said lens, means for releasably retaining said auxiliary shutter in an open retracted position, timer means for releasing said auxiliary shutter to a closed position upon the expiration of a predetermined time cycle, and means for sequentially closing said shutter, removing said screen from the projection field of the lens, and then simultaneously opening said shutter and initiating a time cycle in said timer means.

5. In a photographic device, a film support, a paper support, a projection lens, a projection screen between said lens and said paper support, a shutter for said lens, an auxiliary shutter for said lens, means for releasably retaining said auxiliary shutter in an open retracted position, timer means for releasing said auxiliary shutter to a closed position upon the expiration of a predetermined time cycle, means for sequentially closing said shutter, removing said screen from the projection field of the lens, and then simultaneously opening said shutter and initiating a time cycle in said timer means, said second last mentioned means adapted to sequentially close said shutter, return said screen into the projection field of the lens and concurrently return said auxiliary shutter to an open retracted position upon the expiration of a timing cycle.

6. In a photographic printer of the preview type the combination which comprises a film support, a paper support, a projection lens, a projection preview screen between said lens and paper support, a shutter for said lens, means for actuating said shutter to interrupt a beam projected through said lens incident to moving said preview screen into or out of the projection field of said lens, an auxiliary shutter adapted to interrupt a projected beam independently of said first mentioned shutter, means for releasably retaining said auxiliary shutter in a non-beam-intercepting position, said means including a latch member operatively connected to the plunger of a solenoid, means for normally urging said auxiliary shutter to a beam intercepting position, means for sequentially closing the shutter, removing the screen from the projection field of said lens and then opening the shutter, and means for initiating a time cycle incident to the completion of the sequence of actuating the shutter to interrupt the projection beam, removing the screen from the projection field of said lens and then moving said shutter to a non-beam-intercepting position, said means comprising an electrical switch actuatable by said shutter for closing an electrical circuit to said solenoid, means in series with said solenoid circuit for delaying the completion of the electrical circuit to said solenoid for a predetermined time after the closing of said switch, said auxiliary shutter adapted to assume a beam interrupting position upon actuation of said latch member by said solenoid, and means on said shutter adapted to engage said auxiliary shutter for returning said auxiliary shutter to a non-beam-engaging position to re-engage said latch member incident to the movement of said shutter to a beam interrupting position incident to the movement of said screen into the projection field of said lens and return of said shutter to its initial open, non-beam-interrupting position.

7. In a photographic printer of the preview type including a shutter, a preview screen, and means for actuating said shutter to interrupt a projected beam incident to movement of said screen into or out of the field of said beam, of an auxiliary shutter adapted to interrupt said beam, independently of the shutter, a solenoid, said auxiliary shutter operatively connected to the plunger of said solenoid, an electric timer and an electrical switch, said switch, timer and solenoid being in a series circuit, said first mentioned means adapted to actuate said switch for closing an electrical circuit to said timer and solenoid incident to the movement of said screen out of the field of said beam, and means for moving said auxiliary shutter to a non-beam-intercepting position upon deenergization of said solenoid incident to the movement of said screen into the field of said beam.

8. In a photographic printer of the preview type the combination which comprises a film support, a paper support, a projection lens, a projection preview screen between said lens and paper support, a shutter for said lens, means for actuating said shutter to interrupt a beam projected through said lens incident to moving said preview screen into or out of the projection field of said lens, an auxiliary shutter adapted to interrupt a projected beam independently of said first mentioned shutter, means for releasably retaining said auxiliary shutter in a non-beam-intercepting position, and other means for moving said auxiliary shutter into a beam intercepting position, a timer, means interconnecting said first mentioned shutter and timer for initiating a time cycle in said timer concurrently with the actuation of said shutter incident to movement of said preview screen out of the projection field of said lens, said second last mentioned means being operable upon the expiration of a time cycle thus initiated.

9. In a photographic printer of the preview type the combination which comprises a film support, a paper support, a projection lens, a projection preview screen between said lens and paper support, a shutter for said lens, means for actuating said shutter to interrupt a beam projected through said lens incident to moving said preview screen into or out of the projection field of said lens, an auxiliary shutter adapted to interrupt a projected beam independently of said first mentioned shutter, means for releasably retaining said auxiliary shutter in a non-beam-intercepting position, other means for moving said auxiliary shutter into a beam intercepting position, a timer, means interconnecting said first mentioned shutter and timer for initiating a time cycle in said timer concurrently with the actuation of said shutter incident to movement of said preview screen out of the projection field of said lens, said second last mentioned means being operable upon the expiration of a time cycle thus initiated, and means for returning said auxiliary shutter to a non-beam-intercepting position concurrently with the actuation of the shutter incident to movement of the preview screen into the projection field of said lens.

10. In a photographic device, a lens, a shutter for said lens, a timer, an auxiliary shutter for said lens, means operable incident to the opening of said shutter for initiating a time cycle in said timer, means operable upon the expiration of said timing cycle for closing said auxiliary shutter independently of said first mentioned shutter, and means operable upon closing of said first shutter for opening said auxiliary shutter preparatory to the initiation of another timing cycle to be initiated incident to the opening of the first shutter.

ALVIN L. MAYER.